United States Patent
Park et al.

(10) Patent No.: US 7,243,981 B2
(45) Date of Patent: Jul. 17, 2007

(54) VEHICLE BODY DEFORMATION CONTROL ASSEMBLY

(75) Inventors: Sae U Park, Troy, MI (US); Madhu R Koka, Rochester, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 166 days.

(21) Appl. No.: 11/144,908

(22) Filed: Jun. 3, 2005

(65) Prior Publication Data

US 2006/0273627 A1    Dec. 7, 2006

(51) Int. Cl.
*B60N 3/06* (2006.01)
*B62D 21/15* (2006.01)

(52) U.S. Cl. .................. 296/187.08; 280/784
(58) Field of Classification Search ............... 180/274; 188/371, 372, 373, 376, 377; 280/784; 296/29, 30, 75, 187.01, 187.03, 187.08, 193.07, 296/204, 187.09, 187.1
See application file for complete search history.

(56) References Cited

U.S. PATENT DOCUMENTS

| | | | |
|---|---|---|---|
| 3,794,348 A * | 2/1974 | Fischer | 280/784 |
| 3,831,997 A * | 8/1974 | Myers | 296/187.09 |
| 3,848,886 A * | 11/1974 | Feustel et al. | 280/784 |
| 3,912,295 A * | 10/1975 | Eggert, Jr. | 280/784 |
| 3,940,176 A * | 2/1976 | Ito et al. | 296/187.09 |
| 4,148,505 A * | 4/1979 | Jensen et al. | 280/784 |
| 4,152,012 A * | 5/1979 | Reidelbach et al. | 280/784 |
| 4,413,840 A * | 11/1983 | Shah | 280/784 |
| 4,781,398 A * | 11/1988 | Uebelstadt et al. | 280/784 |
| 4,848,835 A * | 7/1989 | DeRees | 296/204 |
| 5,184,868 A * | 2/1993 | Nishiyama | 296/187.09 |
| 5,370,438 A * | 12/1994 | Mori et al. | 296/203.02 |
| 5,411,308 A * | 5/1995 | Kreis et al. | 296/30 |
| 5,605,353 A * | 2/1997 | Moss et al. | 280/784 |
| 5,609,386 A * | 3/1997 | Takahashi et al. | 296/204 |
| 5,653,495 A * | 8/1997 | Bovellan et al. | 296/203.03 |
| 5,713,625 A * | 2/1998 | Takahashi et al. | 296/204 |
| 5,882,065 A * | 3/1999 | Koiwa et al. | 296/203.02 |
| 5,884,963 A * | 3/1999 | Esposito et al. | 296/187.09 |
| 6,019,419 A | 2/2000 | Browne et al. | 296/187.1 |
| 6,053,564 A * | 4/2000 | Kamata et al. | 295/187.09 |
| 6,099,194 A * | 8/2000 | Durand | 403/270 |
| 6,102,466 A * | 8/2000 | Kanazawa et al. | 296/75 |
| 6,179,079 B1 * | 1/2001 | Basnett | 180/90.6 |
| 6,209,948 B1 * | 4/2001 | Mori et al. | 296/187.09 |
| 6,224,133 B1 * | 5/2001 | Abramoski et al. | 296/75 |
| 6,338,510 B1 * | 1/2002 | Kanamori et al. | 293/154 |
| 6,361,102 B1 * | 3/2002 | Han | 296/203.02 |
| 6,523,884 B2 * | 2/2003 | Czaplicki et al. | 296/187.03 |

(Continued)

*Primary Examiner*—D. Glenn Dayoan
*Assistant Examiner*—Paul Chenevert
(74) *Attorney, Agent, or Firm*—Thomas A. Jurecko

(57) ABSTRACT

A vehicle body assembly including a portion that is subject to deformation during vehicle impact events includes a body component, and at least one deformation control plate carried by the vehicle body assembly to engage the body component and inhibit deformation of the body component beyond a threshold amount. The deformation control plate is arranged to engage with the frame component only when the frame component is deformed beyond a first amount. Further deformation of the frame component bends or otherwise deforms the deformation control plate which provides a force resisting further deformation of the frame component and also dissipates the kinetic impact energy away from the deforming area of the frame component.

16 Claims, 2 Drawing Sheets

U.S. PATENT DOCUMENTS

| | | | |
|---|---|---|---|
| 6,676,709 B1 * | 1/2004 | de la Asuncion | 280/784 |
| 6,705,668 B1 * | 3/2004 | Makita et al. | 296/187.03 |
| 6,733,040 B1 * | 5/2004 | Simboli | 280/800 |
| 6,808,229 B2 * | 10/2004 | Yamaguchi | 296/204 |
| 6,916,063 B2 * | 7/2005 | Song | 296/203.02 |
| 2001/0003399 A1 * | 6/2001 | Kitagawa | 296/75 |
| 2001/0020797 A1 * | 9/2001 | Saeki | 296/203.03 |
| 2002/0185893 A1 * | 12/2002 | Hashirayama et al. | 296/204 |
| 2003/0075377 A1 * | 4/2003 | Roehringer et al. | 180/312 |
| 2003/0222478 A1 * | 12/2003 | Akasaka et al. | 296/187.05 |
| 2004/0113463 A1 * | 6/2004 | Song | 296/204 |
| 2004/0145217 A1 * | 7/2004 | Hanuy | 296/204 |

\* cited by examiner

VEHICLE BODY DEFORMATION CONTROL ASSEMBLY

FIELD OF THE INVENTION

The present invention relates generally to a vehicle body assembly and more particularly to an assembly for controlling vehicle structural deformation during at least certain impact events.

BACKGROUND OF THE INVENTION

Motor vehicle body assemblies are constructed and arranged to support and retain vehicle components and define a passenger cabin in which the driver and one or more passengers may sit in use of the vehicle. The shape and size of vehicle bodies depends upon several factors such as the desired exterior and interior size and aesthetics, aerodynamics, the location and size of included components, and the like.

Portions of the vehicle body assembly, may become deformed in certain vehicle impact events. Among these impact events are tests conducted by governmental, insurance and other agencies to determine the effect of certain impact events on different vehicles. These impact event tests may include full frontal vehicle collisions, offset frontal vehicle collisions, side impact collisions, rear collisions, and others. Some agencies use the data collected by these tests to issue ratings of vehicle body performance and structural integrity, and these ratings purport to be an indicator of the protection afforded to passengers of the vehicle in incidents similar to the tested conditions.

SUMMARY OF THE INVENTION

A vehicle body assembly with a portion that is subject to deformation during vehicle impact events includes a body component, and at least one deformation control plate carried by the vehicle body assembly to engage the body component and inhibit deformation of the body component beyond a threshold amount. In one presently preferred implementation, the deformation control plate is attached to the vehicle body assembly and extends to at least one free end that is adjacent to a frame component and becomes engaged with the frame component only upon deformation of the frame component beyond a first or threshold amount. Further deformation of the frame component bends or otherwise deforms the deformation control plate which provides a force resisting further deformation of the frame component and also a mechanism through which some of the kinetic impact energy can be dissipated away from the deforming area of the frame component, and preferably away from a passenger compartment of the vehicle.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
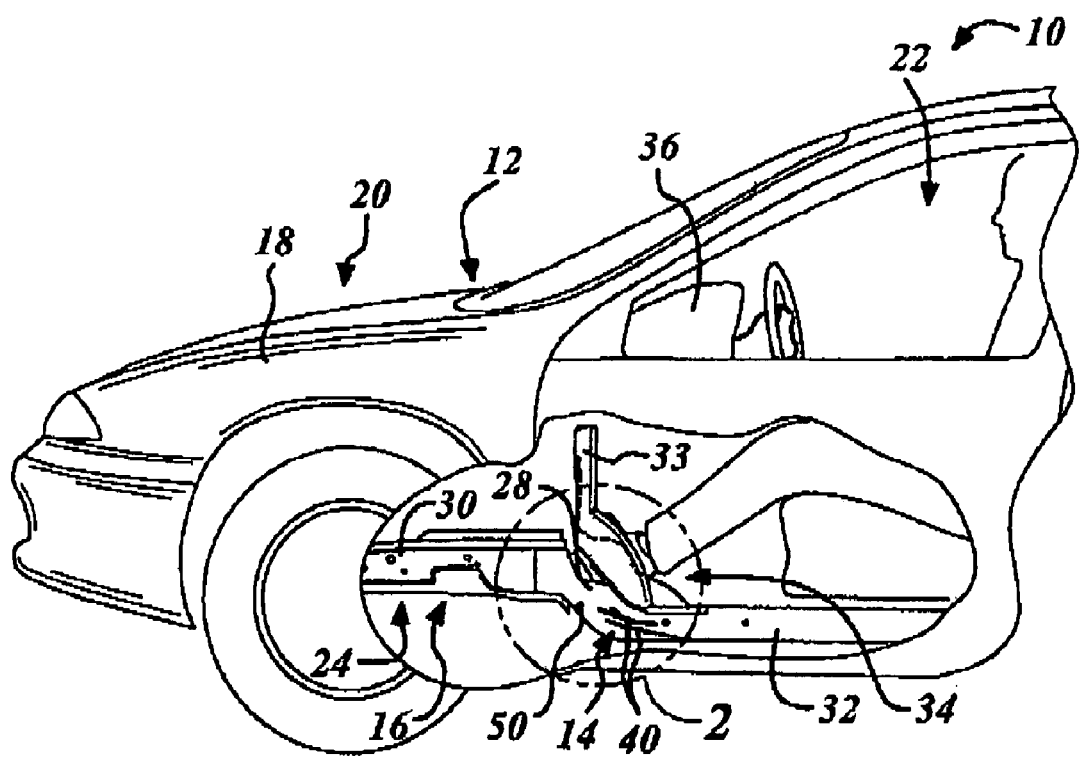
FIG. 1 is a fragmentary side view of a front driver's side portion of a vehicle with a portion broken away to illustrate one presently preferred embodiment of a vehicle body deformation control assembly.
Figure 3:
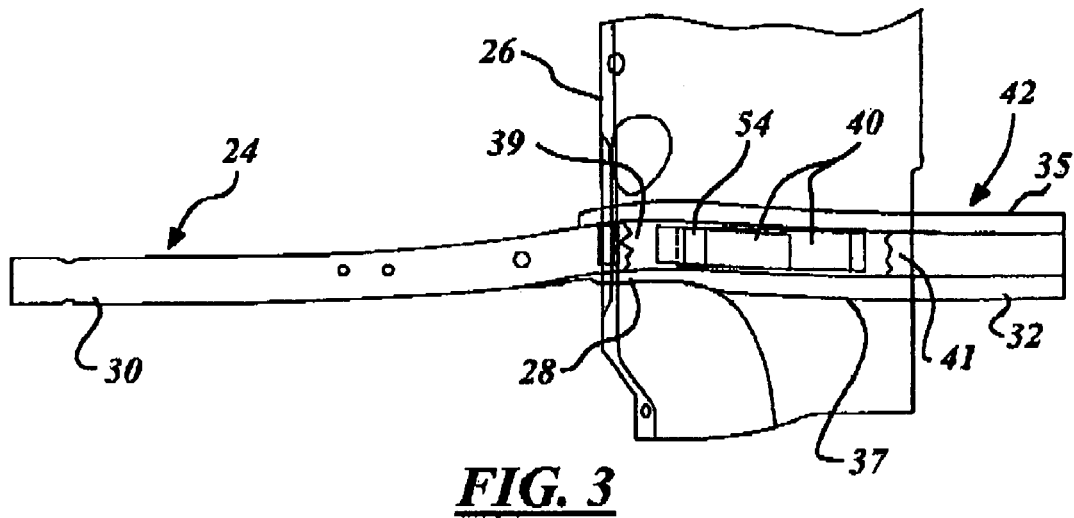
FIG. 3 is a plan view of a portion of the vehicle body and deformation control assembly.

Referring in more detail to the drawings, FIG. 1 illustrates a portion of a vehicle 10 having a body assembly 12 with a deformation control assembly 14 adapted to inhibit deformation of a portion of the vehicle body 12 beyond a threshold amount during a vehicle impact event. The vehicle body 12, only a portion of which is shown in FIG. 1, generally includes a frame 16, an exterior shell 18 carried by the frame 16, and related components. The body 12 typically defines an engine compartment 20, passenger compartment 22 and usually a trunk (not shown). The vehicle frame 16 preferably includes a pair of spaced and generally parallel primary rails 24 extending generally from the area of the front end toward the rear end of the vehicle, and one or more cross members 26 (one of which is shown in FIG. 3) interconnecting the primary rails. The primary rails 24 are preferably generally symmetrical and so only the primary rail 24 extending along the driver's side of the vehicle is shown and described although this disclosure may equally be applied to the passenger side rail or other vehicle body components. Often the frame 16 is integrated with the body 12 to form a so-called unibody.

Figure 2:
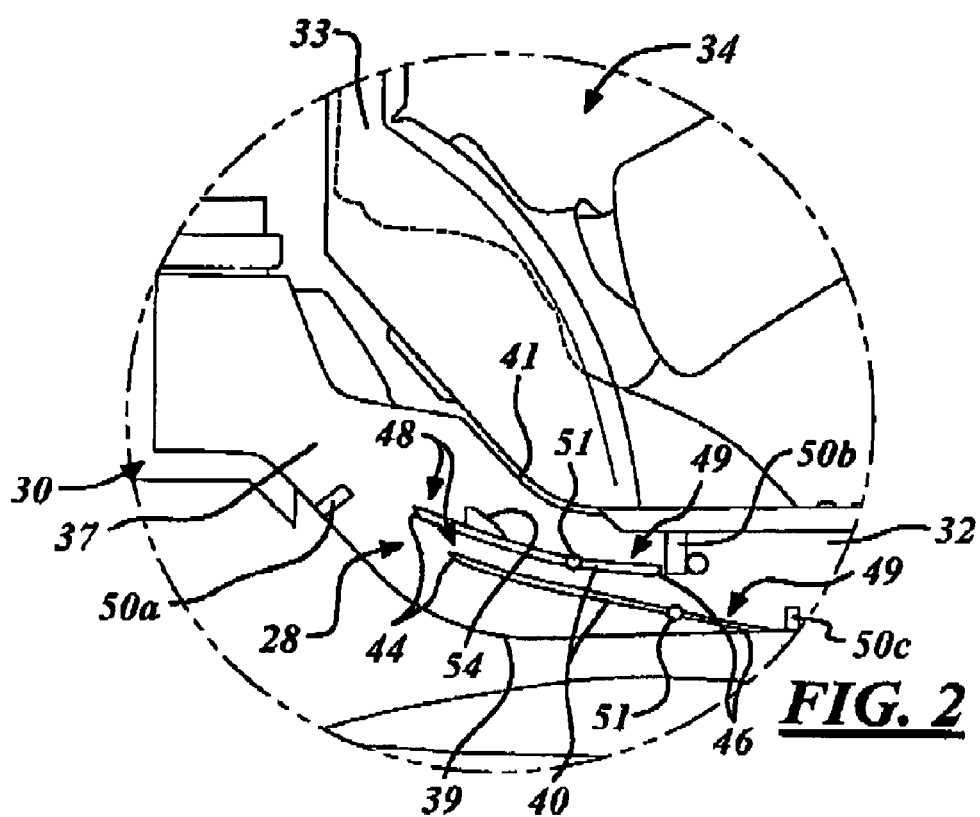
FIG. 2 is an enlarged side view of the encircled portion 2 in FIG. 1.

As best shown in FIGS. 1 and 2, the primary rails 24 may include a so-called "kick down" portion 28 which transitions the primary rails 24 from an elevated first or front rail portion 30 to a second or mid rail portion 32 extending beneath the passenger compartment 22 of the vehicle. The kick down portion 28 underlies at least a portion of a foot well 34 extending beneath a dashboard 36 with an engine compartment wall 33 between them. During relatively severe, high speed vehicle impact events, portions of the vehicle body or frame may impinge upon, deform and/or move various components of the passenger compartment 22 and thereby cause intrusion into the interior space of the passenger compartment 22.

To inhibit or limit the intrusion into the passenger compartment 22 during some vehicle impact events, at least a portion of the deformation control assembly 14 preferably is disposed between the passenger compartment 22 and at least one adjacent vehicle body component. In one presently preferred implementation, the deformation control assembly 14 includes at least one deformation control plate 40 carried by a vehicle body component such as a primary rail 24 generally in an area adjacent to the passenger compartment 22 of the vehicle 10 in the embodiments shown herein, two control plates 40 are used. Each control plate 40 is independently carried by the rail 24 and independently engageable and functional during a vehicle impact event. Of course, any number of control plates 40 can be used as desired.

Each control plate 40 preferably is a generally elongate, rectangular metal plate extending generally parallel to the frame rail 24 which carries it, and has at least a portion adapted to engage an adjacent vehicle body component during a vehicle impact event to inhibit further deformation of the vehicle body component after its engagement with a deformation control plate 40. The width, length, thickness, strength and resistance to deformation or bending of the control plate 40 can be varied as desired for a particular application. In one presently preferred implementation, the rail 24 that carries the control plate 40 is a generally rectangular box with opposed side walls 35, 37 a lower wall 39 and an upper wall 41 that both span and interconnect the side walls 35, 37, and a hollow interior 42 in which the control plate 40 can readily be received. Each control plate 40 is preferably fixed to the vehicle rail between opposed ends 44, 46 of the control plate 40, such as by welding it to the side walls 35, 37 of the rail 24. The control plates 40 preferably are fixed to the rail so that at least one and preferably both ends 44, 46 can be bent or deformed about the fixed portion of the control plates. Desirably, at least one and preferably both ends 44, 46 of each control plate 40 are cantilevered from the fixed portion of the control plate. In one implementation, each control plate 40 may be carried by a separate cylindrical rod 51 (as shown in FIGS. 2 and 3) each of which is carried by the rail such as by disposing opposed ends of the rod 51 through openings in the rail. The rod 51 of each control plate 40 may be fixed to the rail 24 or may permit limited rotation of the control plates 40 upon initial engagement of the rail 24 with the control plates, as desired. Each control plate 40 may be disposed at an acute included angle relative to the general orientation of the rail 24 to which it is fixed, and may be bent to control engagement with the adjacent frame component and also the deformation characteristics and reactive force provided by the control plate 40 on the frame component during a vehicle impact event.

Therefore, in this embodiment each end 44, 46 or adjacent portions of the control plate 40 may engage the rail 24 and each portion may be deformed or bent during a vehicle collision to limit the maximum deformation of adjacent components and help absorb, dissipate and distribute impact energy forces within the frame rail 24 and vehicle body generally. A first contact area 48 of each deformation control plate may be located generally adjacent to and includes the first end 44 which may be disposed adjacent to and adapted in some collisions to engage the lower wall 39 of the rail 24 in the area of the kick down 28, as previously discussed. A second contact area 49 of the deformation control plate may be disposed adjacent to and includes the opposite end 46 and may also inhibit deformation of the lower wall 39 of the frame rail 24 or other frame or vehicle body component. Of course, other locations, constructions and arrangements of the deformation control plates 40 may be employed.

Figure 4:
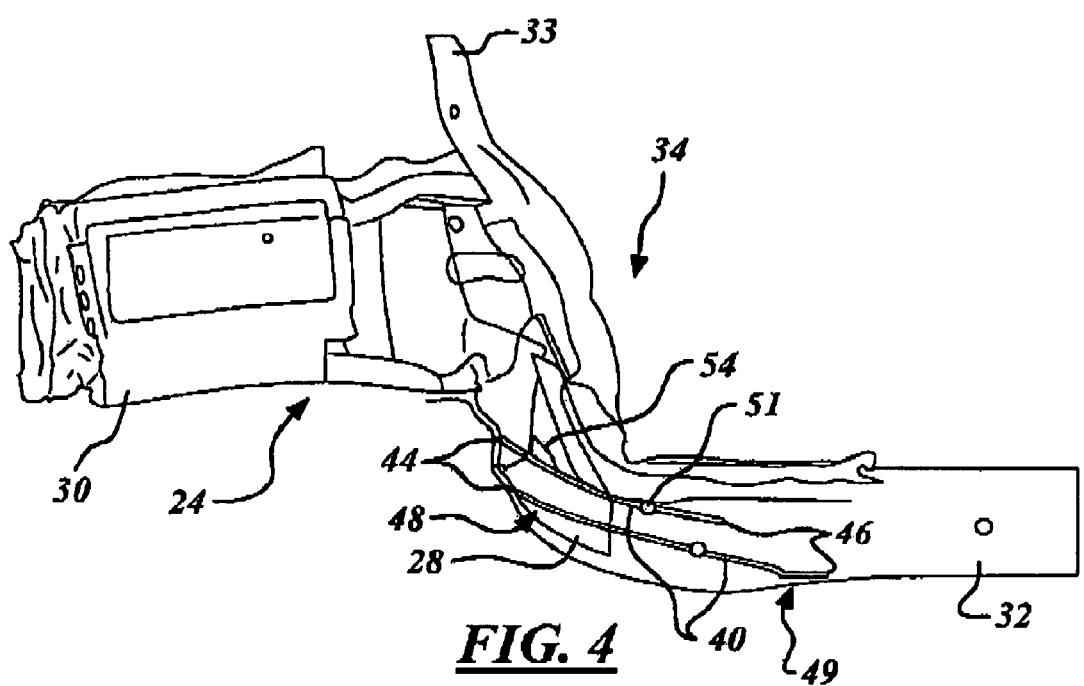
FIG. 4 is a side view a vehicle body assembly after a vehicle impact event.

As best shown in FIGS. 1 and 2, the deformation control assembly may further include a block plate 50a carried by the adjacent vehicle body component (shown as rail 24) and adapted to be moved into engagement with a deformation control plate 40 during some vehicle impact events. The block plate 50a is positioned and oriented to better control and improve predictability of the engagement and deformation of the control plate 40 during a vehicle impact event. Also, as best shown in FIG. 2, additional block plates 50b, 50c may be provided to engage a respective one of the ends 46 of the control plates 40, if desired. Of course, the deformation control plates 40 may directly engage the vehicle body component without any block plates 50a, 50b, 50c between them, as generally shown in FIG. 4.

In the presently preferred embodiment, one free end 44 of each control plate 40 is preferably spaced from the vehicle body component and/or a corresponding block plate 50 with which it may become engaged during a vehicle impact event by a distance equal to a threshold amount of deformation of that frame component. Accordingly, the ends 44 of the deformation control plates 40 only engage the vehicle body component and inhibit further deformation thereof after initial deformation of the vehicle body component beyond a threshold amount, which, for example, can be measured as a linear distance, such as between 20 mm and 100 mm, by way of example. Accordingly, in vehicle impact events that do not cause sufficient deformation of the vehicle body component, the ends 44 of the deformation control plates 40 are not engaged by the vehicle body component and do not provide any force inhibiting deformation of the vehicle body component. Generally, these impact events do not cause sufficient vehicle body deformation to cause significant passenger cabin intrusion or displacement of passenger cabin components. During a vehicle impact event wherein the vehicle body component is deformed sufficiently to engage the deformation control plates 40, as shown in FIG. 4, the deformation control plates 40 provide a force resisting or inhibiting further deformation of the vehicle body component to limit its travel in the direction of bending of the control plates 40, which in the preferred embodiment is in the direction of the passenger compartment 22. The control plates 40 preferably are constructed and arranged to provide a first force on the vehicle body component during deformation of the vehicle body component up to a threshold amount and to provide an increased force on the vehicle body component after it has been deformed the threshold amount to inhibit deformation of the vehicle body component beyond the threshold amount. The first force may be zero, such as when the control plates are initially spaced from and not in contact with the vehicle body component prior to its deformation.

As best shown in FIG. 2, a deformable buffer portion 54 may be provided on a surface of a control plate 40 to engage an area of the rail 24 such as its upper waif 41, to provide a spring, cushion or impact absorber to further dissipate energy during the vehicle impact event and inhibit or reduce intrusion into the passenger compartment 22 or displacement of components within the passenger compartment. The buffer portion 54 provides another contact area of the deformation control plates and may be disposed anywhere along the deformation control plate as desired, and more than one buffer portion may be used on a deformation control plate, as desired. The buffer portion 54 may also provide an area of reinforcement to provide localized bend points spaced from the fixed portion of the control plate 40 to permit further control of the bending and deformation of the control plate.

While shown with their ends 44 spaced from the vehicle body frame component (the rail 24 in this embodiment), one or more of the control plates 40 may be disposed with its free end contacting the vehicle body component prior to a vehicle impact event. The control plate or plates 40 may be configured so that they provide less resistance to deformation of the vehicle body component during an initial extent of the deformation or travel of the vehicle body component during a vehicle impact event, and a greater resistance to further deformation after a threshold amount of deformation. In this manner, the overall stiffness of the vehicle body component during its initial deformation is not significantly different with the control plate 40 than without the control plate 40 so that the magnitude of the impact load or force distributed within the passenger compartment 22 during such vehicle impact events is not significantly different.

One example of a vehicle impact event currently performed during New Car Assessment Program (NCAP) rating tests is a full-frontal collision wherein the front end of a vehicle traveling at 30 miles per hour is collided with a rigid barrier. As a result of this impact event at least a portion of the frame 16 is deformed, and the frame rail 24 in the area of the kick down 28 is deformed a first amount which will vary depending on the vehicle tested. Another example of a vehicle impact event is the Insurance Institute for Highway Safety (IIHS) vehicle test wherein a vehicle is collided at speed into a barrier that is offset so that only a portion of the front of the vehicle actually engages the barrier. Because only a portion of the front of the vehicle impacts the offset barrier, the majority of the impact force is transmitted to the frame rail on the side of the vehicle aligned with and engaged by the barrier. Under current IIHS test conditions, the frame rail 24 on the driver's side of the vehicle 10 is more severely deformed than during the NCAP test and hence, that frame rail 24 is deformed further than during a NCAP test crash event.

In one presently preferred embodiment of the control plates 40, the ends 44 of each control plate 40 are spaced from the rail kick down portion 28 a distance at least equal to the first amount of deformation which occurs during an NCAP full frontal impact event. Accordingly, during a full-frontal impact event like that of an NCAP test, the rail kick down 28 is not deformed enough to significantly engage the control plates 40. But, during an offset barrier impact test, and other impact events causing similar deformation of the rail 24, the deformation control plates 40 preferably are engaged by the rail kick down portion 28 and act to retard and limit further deformation of that area of the frame, dissipate impact energy and distribute at least some of that energy within the frame rail 24 and generally away from the passenger compartment 22 of the vehicle 10. Of course, the noted crash events are merely representative of a wide range of vehicle impact events that may occur in use of a vehicle, and the deformation control plates 40 may be active (i.e. significantly engaged by a vehicle body component) or inactive (i.e. not significantly engaged with a vehicle body component) during various of these events in accordance with a particular design of the vehicle 10 and the deformation control assembly 14.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the deformation control assembly has been shown and described as interacting with a vehicle frame component, the assembly may be utilized with other vehicle components or assemblies. Of course, still other modifications and substitutions can be made. The invention is defined by the following claims.

What is claimed is:

1. A vehicle body assembly including a portion that is subject to deformation during vehicle impact events, comprising:
   a vehicle body component subject to deformation during at least some vehicle impact events; and
   at least one deformation control plate coupled to the vehicle body assembly such that at least one end of the at least one deformation control plate is cantilevered adjacent to the vehicle body component to provide a first force on the vehicle body component during deformation of the vehicle body component up to a threshold amount and to provide an increased force on the vehicle body component after the vehicle body component has been deformed the threshold amount to inhibit deformation of the vehicle body component beyond the threshold amount.

2. The vehicle body assembly of claim 1 wherein more than one deformation control plate is provided, with each deformation control plate adapted to independently engage the vehicle body component to inhibit deformation of the vehicle body component beyond said threshold.

3. The vehicle body assembly of claim 1 which includes a passenger cabin disposed generally adjacent to the vehicle body component and wherein at least a portion of the deformation control plate is disposed between the vehicle body component and the passenger cabin.

4. The vehicle body assembly of claim 1 wherein the vehicle body component includes a portion of a rail of a frame of the vehicle body assembly.

5. The vehicle body assembly of claim 1 wherein the deformation control plate includes a deformable buffer portion adapted to engage a portion of the vehicle body assembly.

6. The vehicle body assembly of claim 1 wherein the first force is zero.

7. The vehicle body assembly of claim 6 wherein the deformation control plate is spaced a distance from the vehicle body component that is at least equal to the threshold amount of deformation of the vehicle body component.

8. The vehicle body assembly of claim 1 wherein said at least one deformation control plate is contoured between ends of the deformation control plate, relative to the frame component so that deformation of the deformation control plate by the vehicle body component during a vehicle impact event occurs in a predetermined manner and said at least one deformation control plate provides a predetermined force resisting such deformation.

9. The vehicle body assembly of claim 8 wherein said at least one deformation control plate is attached to the vehicle body assembly and includes a bend between a free end of the deformation control plate and a point of attachment of the deformation control plate to the vehicle body assembly to control deformation of the control plate when engaged by said vehicle body component.

10. The vehicle body assembly of claim 1 wherein said at least one deformation control plate includes a first contact area arranged to engage the vehicle body component to limit deformation of the vehicle body component and a second contact area arranged to engage another portion of the vehicle body assembly to inhibit deformation of at least one of the deformation control plate and said another portion of the vehicle body assembly.

11. The vehicle body assembly of claim 10 wherein the second contact area is movable relative to the first contact area and is yieldable upon contact with said another portion of the vehicle body assembly.

12. The vehicle body assembly of claim 10 wherein the deformation control plate has opposed ends and is connected to the vehicle body component between the ends of the deformation control plate and the first contact area is adjacent to one end of the deformation control plate and the second contact area is adjacent to the other end of the deformation control plate.

13. A vehicle body assembly including a portion that is subject to deformation during vehicle impact events and a passenger cabin, comprising:
   a frame component disposed adjacent to the passenger cabin; and
   at least one deformation control plate coupled to the vehicle body assembly with a portion disposed between the frame component and the passenger cabin, the at least one deformation control plate coupled to the vehicle body assembly such that at least one end of the at least one deformation control plate is cantilevered to engage the frame component upon deformation of the frame component beyond a threshold amount and in a direction of the at least one deformation control plate to inhibit further deformation of the frame component in that direction.

14. The vehicle body assembly of claim 13 wherein the frame component includes a first rail portion, a second rail portion and a kick down portion between the first rail portion and the second rail portion and said at least one deformation control plate is disposed in the area of the kick down portion.

15. The vehicle body assembly of claim 14 wherein said kick down portion includes opposed side walls to which said at least one deformation control plate is attached.

16. The vehicle body assembly of claim 15 wherein said kick down portion also includes a wall spanning the side walls and said at least one deformation control plate is constructed and arranged to engage said wall spanning the side walls when the frame component has been deformed beyond the threshold amount.

* * * * *